United States Patent [19]

Heater

[11] 4,370,452

[45] Jan. 25, 1983

[54] PROCESS TO INDUCE RAPID CURING OF A COPOLYESTER RESIN WITH EPOXIDE COMPOUNDS AND A COMPOSITION FORMED FOR THAT PROCESS

[75] Inventor: Paul L. Heater, Massillon, Ohio

[73] Assignee: The Goodyear Tire & Rubber Company, Akron, Ohio

[21] Appl. No.: 223,972

[22] Filed: Jan. 12, 1981

[51] Int. Cl.$^3$ .................. C08L 63/00; C08L 67/02
[52] U.S. Cl. .................. 525/438; 524/904; 525/533; 525/934; 528/112; 528/296; 528/297
[58] Field of Search .................. 525/438, 934, 533; 528/297, 296, 112; 524/904

[56] References Cited

U.S. PATENT DOCUMENTS

| | | | |
|---|---|---|---|
| 3,397,254 | 8/1968 | Wynstra | 525/438 |
| 3,548,026 | 12/1970 | Wiesfeld et al. | 525/533 |
| 3,749,758 | 7/1973 | Gannon | 528/110 |
| 3,758,633 | 9/1973 | Labana et al. | 525/108 |
| 3,769,226 | 10/1973 | Markovitz et al. | 528/112 |
| 3,842,035 | 10/1974 | Klaren | 525/934 |
| 3,966,836 | 6/1976 | de Cleur et al. | 525/438 |
| 3,988,288 | 10/1976 | Yamauchi et al. | 260/37 EP |
| 3,989,679 | 11/1976 | Sluis et al. | 525/533 |
| 3,998,905 | 12/1976 | Labana et al. | 260/29.1 SB |
| 4,026,862 | 5/1977 | Smith et al. | 525/533 |
| 4,065,438 | 12/1977 | Verborgt | 528/296 |
| 4,071,504 | 1/1978 | Korver | 525/437 |
| 4,085,159 | 4/1978 | Marsiat | 525/438 |
| 4,087,479 | 5/1978 | Toyota et al. | 525/438 |
| 4,112,012 | 9/1978 | de Cleur et al. | 525/438 |
| 4,124,570 | 11/1978 | Scheibelhoffer et al. | 525/437 |
| 4,130,601 | 12/1978 | Ohoka et al. | 525/438 |
| 4,135,009 | 1/1979 | Mercurio | 525/438 |
| 4,140,728 | 2/1979 | Hahn et al. | 525/438 |
| 4,145,370 | 3/1979 | Sreeves | 525/438 |
| 4,147,737 | 4/1979 | Sein et al. | 525/438 |
| 4,169,006 | 9/1979 | Matsubara et al. | 156/182 |
| 4,223,097 | 9/1980 | Johannes et al. | 525/438 |
| 4,255,553 | 3/1981 | Mizumura et al. | 525/533 |
| 4,264,751 | 4/1981 | Scheibelhoffer et al. | 528/302 |

FOREIGN PATENT DOCUMENTS

1381262 1/1975 United Kingdom .................. 525/934

*Primary Examiner*—Ronald W. Griffin
*Attorney, Agent, or Firm*—D. J. Hudak; Bruce Hendricks

[57] ABSTRACT

A copolyester resin having modified carboxyl terminated ends is disclosed, as well as the method for making and using that compound with epoxide curing compounds in powder coating resins for substrates. The polymerization of the copolyester resin contains a reactor compounding stage which permits the reaction of the carboxyl termini with a curing reaction catalyst prior to any compounding or mixing of the modified copolyester resin with the epoxide curing compounds. The modification to these end groups of the copolyester resin creates activated termini which, although stable of themselves, react more rapidly, when the modified copolyester resin is compounded with the epoxide curing compounds and subsequently heated on the substrate, than with the conventional introduction of the epoxide catalyst during final compounding. Alteration of the curing parameters of the modified copolyester resin with the epoxide curing compounds imparts greater impact strength and better leveling properties at temperatures between 300° F. and 450° F.

19 Claims, No Drawings

PROCESS TO INDUCE RAPID CURING OF A COPOLYESTER RESIN WITH EPOXIDE COMPOUNDS AND A COMPOSITION FORMED FOR THAT PROCESS

TECHNICAL FIELD

This application relates to the use of copolyester resins as powder coating resins and the process by which curing of the copolyester resin with an epoxide compound is rapidly induced by the reaction of the copolyester resin with a curing reaction catalyst prior to compounding that reaction product with the epoxide compound. Preparing the termini of the copolyester resin in this reaction with the curing reaction catalyst induces more rapid curing at reduced concentrations of the curing reaction catalyst, compared with conventional blending, and imparts acceptable impact strength to the coating upon curing at reduced curing times.

BACKGROUND ART

Heretofore, it has been standard and conventional to react copolyester resins with various epoxide compounds to cure the copolyester resins into a coating upon various substrates. To induce the curing of the copolyester resin powder with the epoxide compound, various curing reaction catalysts have been traditionally introduced at the time of compounding mixtures of the resin and the epoxide compound. Curing reaction catalysts are those catalysts used during the curing reaction of a carboxyl terminated copolyester resin and an epoxide compound. These curing reaction catalysts followed a reaction kinetic mechanism which prepared the termini of the copolyester resin chains whereupon the epoxide groups of the epoxide compound reacted to cure and crosslink the copolyester polymer. The reaction kinetics of this curing reaction require a relatively slow first step of reaction of a copolyester resin with the curing reaction catalyst. Slow curing of the copolyester resin with the epoxide compound inhibited desirable impact strength, which has been improved by the inventor using rapid curing systems for these two compounds. Therefore, the need exists for a reaction which precedes the compounding and curing of the copolyester resin with the epoxide compound to prepare the copolyester resin for rapid curing with the epoxide compound upon mixing with that epoxide compound and heating of the mixture.

DISCLOSURE OF INVENTION

It is an object of the present invention to provide a reaction product of a copolyester resin and a curing reaction catalyst to induce rapid curing of that activated copolyester resin with the epoxide compounds when mixed and heated for final curing for coating a substrate.

It is another object of the invention to provide a process for inducing the rapid curing of the copolyester resin, wherein the copolyester resin is reacted with a curing reaction catalyst during polymerization of the copolyester resin, in order to activate termini of the copolyester polymer prior to final compounding that material with an epoxide compound.

Yet another object of the invention is to provide a copolyester resin having terminal carboxyl groups which may be activated by a curing reaction catalyst during polymerization of the copolyester resin and prior to any final compounding with the epoxide compound for curing and coating purposes.

Yet another object of the invention is to provide a process for the rapid curing of any copolyester resin, as above, where the copolyester resin is capped with carboxyl groups for subsequent activation by the curing reaction catalyst.

These and other objects of the present invention which will become more apparent as the best mode for carrying out the invention is described, are achieved by: a process to induce rapid curing of a copolyester resin, comprising: reacting from about 0.001 to about 10.0 weight percent of a curing reaction catalyst with the copolyester resin during the polymerization of the copolyester resin, such that the copolyester resin has activated termini prior to compounding the copolyester resin with an epoxide compound, said activated termini permitting rapid curing of the copolyester resin after final compounding and during heating of the copolyester-epoxide mixture.

The objects of the invention are also achieved by a composition of matter, comprising: the reaction product of a copolyester resin and a curing reaction catalyst, said reaction product having activated termini for rapid curing upon heating, of the mixture of said reaction product and epoxide compound, said curing reaction catalyst reacting in a concentration of from about 0.001 to about 10.0 weight percent of said copolyester resin.

BEST MODE FOR CARRYING OUT THE INVENTION

Copolyester resins, as described above, react with various curing agents to form industrial coating resins for various substrates such as appliances and as decorative finishes on outdoor furniture and other similar applications. Typically these resins are the combination of the copolyester resin with a curing agent, which may be an epoxide compound when the copolyester resin has terminal carboxyl groups. The properties of the final resin compound are dependent upon (1) the chemical and physical properties of the copolyester resin prior to final compounding, (2) the method by which the copolyester resin is reacted with the curing agent, and (3) the mechanism of curing between the copolyester resin and the curing agent.

As described in U.S. Pat. No. 4,124,570 and U.S. Pat. No. 4,264,751, both of which are assigned to the Assignee of this application, copolyester resins may be produced to have significant hydroxyl end group concentration. The curing agent for these copolyester resin typically may be a melamine or an isophorone diisocyanate.

When copolyester resins have significant carboxyl group concentration, the curing agent may be an epoxide compound. Therefore, the reaction mechanism of the copolyester resin with epoxide compounds requires the copolyester resin to have significant carboxyl end group concentration on the termini of the copolyester polymers.

The production of the copolyester resin conventionally employs three stages: an esterification stage, a condensation stage, and a finishing stage. The preparation of the polyester prepolymer occurs in the esterification stage by the reaction of a diol and a dicarboxylic compound. Optionally, the introduction of a chain branching agent in the esterification stage such as that disclosed in U.S. Pat. No. 4,264,751, may produce a polyester prepolymer having internal chain branching which has been found by this inventor to lower the melt viscosity of the polyester at a given molecular weight to improve the leveling properties of the final powder coating. Leveling properties are defined to be that property yielding a smooth and substantially untextured finish over a smooth substrate such as polished metal.

Further, introduction of a multi-functional alcohol chain branching agent into the esterification stage creates a polymer having an increased hydroxyl number, which upon carboxyl end group capping minimizes the excessive charging of a carboxyl capping agent. That composition, remaining unreacted in excessive concentrations, may be toxicologically undesirable.

The polyester prepolymer, whether subject to internal chain branching or not, is polycondensed in the condensation stage to produce a copolyester resin having an intrinsic viscosity from about 0.10 to about 0.26 dl/g and preferably from about 0.12 to about 0.22 dl/g. Intrinsic viscosity is determined by a method utilizing a 60/40 (by weight) mixture of phenol/tetrachloroethane as a solvent and a reading of intrinsic viscosity at 30° C., according to Goodyear Polyester Method R-100e.

The dicarboxylic compound of the present invention may be either a dicarboxylic acid or dicarboxylic ester. The discarboxylic acids may be an alkyl dicarboxylic acid having total of from 2 to 16 carbon atoms, or an aryl dicarboxylic acid having a total of from 8 to 16 carbon atoms.

Specific examples of alkyl dicarboxylic acids suitable for the present invention are oxalic acid, malonic acid, succinic acid, glutaric acid, adipic acid, pimelic acid, suberic acid, azelaic acid, sebacic acid, and the like. Various examples of an aryl acid include the various isomers of phthalic acid, such as paraphthalic (terephthalic) acid and naphthalic acid. Specific examples of alkyl substituted aryl acids include the various isomers of dimethylphthalic acid, such a dimethylisophthalic acid, dimethylorthophthalic acid, and dimethylterephthalic acid; the various isomers of diethylphthalic acid, such as diethylisophthalic acid, diethylorthophthalic acid, and diethylterephthalic acid; the various isomers of dimethylterephthalic acid, such as 2,6-dimethylnaphthalic acid and 2,5-dimethylnaphthalic acid; and the various isomers of diethylnaphthalic acid. Generally dimethylterephthalic acid and terephthalic acid are the preferred dicarboxylic acids.

In lieu of the various dicarboyxlic acids, the varous diesters thereof may be utilized. Thus, the dicarboxylic compound may be an alkyl diester containing a total of from about 2 to 20 carbon atoms, as well as the alkyl substituted aryl diesters containing from about 10 to about 20 carbon atoms. Examples of specific alkyl diesters include dimethyl adipate, diethyl adipate, and the like. Specific examples of the various alkyl substituted aryl diesters include the various isomers of dimethylphthalate, the various isomers of diethylphthalate, the various isomers of dimethylnaphthalate, and the various isomers of diethylnaphthalate. Of the dicarboxylic diesters, preferably, the various isomers of dimethylphthalate (dimethylterephthalate) are used.

Of the dicarboxylic compounds, the various isomers of dimethylterephthalate are most preferred.

These carboxylic acids or the diesters thereof react in the esterification stage with a diol containing from about 2 to 10 carbon atoms. The glycols may be straight-chained or branched. Specific examples include ethylene glycol, propylene glycol, trimethylene glycol, 1,2-butane diol, 1,3-butane diol, 1,4-butane diol, 2,3-butane diol, neopentyl glycol, hexamethylene glycol, cyclohexane dimethanol, and the ester diol product of neopentyl glycol and hydropavalic acid (propanoic acid, 3-hydroxy-2,2 -dimethyl-3-hydroxy-2,2-dimethyl propyl ester). Of the various diols, neopentyl glycol is most preferred. The diol is added to the esterification stage in the reactant charging step in a concentration in comparison to the dicarboxylic compound in a mole ratio from about 2.20 to about 1.15:1. Preferably, the molar ratio is from about 1.7 to about 1.3:1.

In those circumstances when an internal chain branching agent is desirable, the chain branching agent of the present invention is a compound having at least a functionality of 3 to incorporate within the chain of the polyester prepolymer and retain a branch reactive cite. Chain branching agents having at least a trifunctionality include trimellitic anhydride, pentaerythritol, glycerol, trimethylol propane, triethylol propane, and other multi-functional alcohols. The chain branching agent is reacted in the esterification stage in a concentration in comparison with the concentration of the dicarboxylic compound in a mole ratio less than about 0.10:1. Desirably the chain branching agent has a concentration from about 0.5 to 10 mole percent, comparative to the concentration of the dicarboxylic compound, and preferably in a concentration from about 3 to 5 mole percent.

The esterification stage comprises a reactant charging step and a chain branching agent addition step. The chain branching agent addition step occurs simultaneously with the reactant charging step when the chain branching agent is a multi-functional alcohol such as trimethylol propane, triethylol propane, pentaerythritol, and glycerol. The reactant charging step precedes the chain branching agent addition step when trimellitic anhydride is the chain branching agent. In such later case, the chain branching addition step proceeds after at least 90 percent of the dicarboxylic compound and diol have completed methanolysis. Whereas the esterification stage proceeds uninterrupted or undelayed when the chain branching agent is one of the multi-functional alcohols, an additional 20 minutes is required in the esterification stage before the condensation stage when the trimellitic anhydride is the chain branching agent.

The copolyester resin having carboxyl terminated end groups are prepared to be reacted with the curing reaction catalyst of the present invention. These copolyester resins preferably have internal chain branching to provide a lower melt viscosity of the polyester at a given molecular weight to improve the leveling properties of the final powder coating.

In those circumstances where the copolyester resin produced as descirbed hereinabove does not contain carboxyl terminated end groups, the termini of the copolyester polymer chain must be capped with carboxyl groups for reaction with the epoxide compounds to cure the copolyester resin. The carboxyl capping agents may be any anhydride of a carboxylic acid having at least two acid groups, which upon reaction with the terminus of the polymer chain, retains a free carboxyl acid group as a reactive site for activation by the curing reaction catalyst. Specific examples of these anhydrides include anhydrides of the formula:

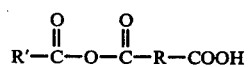

where R is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, an aryl radical having from 6 to 24 carbon atoms; where R' is an organic radical volatile at temperatures of the carboxyl capping reaction;

and anhydrides of the formula:

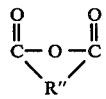

where R" is an organic radical having from 1 to 18 carbon atoms. Desirably, anhydrides of acids having at least 2 carboxylic acid end groups may be used as the carboxylic acid capping agent. Specific examples of these anhydrides are phthalic anhydride, succinic anhydride, trimellitic anhydride, and the like. Of these anhydrides, trimellitic anhydride is preferred.

The carboxylic acid capping agent may be added subsequent to the condensation stage but prior to the finishing stage at a time denominated the reactor compounding stage. In this reactor compounding stage, the carboxylic acid capping agent may be added in a concentration of from about 1 mole percent to about 25 mole percent per mole of carboxylate units contained in the final polymer. Desirably, the concentration is from about 10 mole percent to 14 mole percent per mole of carboxylate units. Preferably the concentration of the carboxylic acid capping agents is about 12.5 mole percent per mole of carboxylate units.

After the copolyester resin has been polycondensed in the condensation stage maintaining significant carboxylic acid end groups, or in the circumstance where the copolyester resin having hydroxyl end groups has been capped with carboxyl end groups in the reactor compounding stage, that same stage of the polymerization permits the initial reaciton of the copolyester resin with the curing reaction catalyst. This reaction activates termini having carboxyl end groups for subsequent curing by th epoxide compounds.

When employing the reactor compounding stage to introduce the carboxyl capping agent and the curing reaction catalyst of the present invention, temperatures within the reactor compounding stage should range from about 150° to about 275° C. Desirably the temperature should range between 200° and 250° C., and preferably the range of temperature is from about 210° to about 235° C. The pressure during the reactor compounding stage is about 1 atmosphere or ambiant pressures, although the atmosphere for the reactor compounding stage is an inert atmosphere, preferably that of $N_2$.

It has been found by the inventor that the activation of the termini of the copolyester resin during the reactor compounding stage does not affect the chemical properties of the copolyester resin. Therefore, the intrinsic viscosity of the copolyester resin having termini activated by the epoxide catalyst may range from about 0.12 to about 0.35 dl/g and desirably from about 0.12 to about 0.22 dl/g. Further, the glass transition temperature of the copolyester resin having activated termini is at least 40° C. and desirably from about 60° to about 75° C. Preferably, the intrinsic viscosity of the copolyester resin having activated termini is about 0.19 and the glass transition temperature is about 68° C. The copolyester resin having activated termini is a stable product of itself, capable of storage for indefinite periods of time before final compounding with the epoxide compound. As such, the activation of the termini of the copolyester resin precedes any compounding of the copolyester with the epoxide compound, a concept unknown in the conventional art. By the term final compounding, it is meant any compounding of the copolyester and the epoxide compound by any process, for example, extruding and the like.

It has been found by the inventor that the reaction mechanism for the catalyzed curing of the copolyester resin with the epoxide compound requires an activated termini for the copolyester resin. These activated termini are generated in the first steps of the reaction by the reaction of a curing reaction catalyst with the carboxyl terminus of the copolyester polymer. It has also been found by the inventor that the reaction mechanism for curing of the copolyester resin with the epoxide compound has a reaction rate probably determined by this initial activation of each carboxyl terminus. Therefore, preparation of the activated termini for the copolyester resins during polymerization, yeilding a stable product, permits a rapid curing of the activated copolyester resin upon mixing with the epoxide compound and subsequent heating of the mixture. Because as a stable product, the activated copolyester resin may be stored indefinitely, the polymerization of the copolyester resin may proceed from the reactor compounding stage through to the finishing stage. Subsequently, at a time determined by manufacturing parameters, the reaction product of the copolyester resin and the curing reaction catalyst is mixed with the epoxide compound, and upon heated application, more rapidly cures with the epoxide compound, which yields a coating material having greater impact strength. Further, the gel time is reduced and the curing cycle is minimized, resulting in a more rapid development of desirable physical properties.

The curing reaction catalyst may be any catalyst known to those skilled in the art which is conventionally used during the compounding of the copolyester resin with the epoxide compound. Desirably the catalyst may be a compound having one of the following formulas:

$$N^+R_4X^-$$

where R, which may be the same or different, is selected from the group consisting of an alkyl radical having from 1 to 18 carbon atoms, a halo-substituted alkyl radical having from 1 to 18 carbon atoms, a hydroxy substituted alkyl radical having from 1 to 13 carbon atoms, an aryl radical having from 6 to 24 carbon atoms, and an aralkyl radical having from 7 to 24 carbon atoms, and combinations thereof; and where X is a halide radical selected from the group consisting of fluoride, chloride and bromide;

where R is the same as that described above and may be the same or different; where A is selected from the group consisting of N, P, and Sn; and where t is 3 when A is N or P, or is 4 when A is Sn; or

where n is a number from 1 to 3, where R is the same as that described above, where M is a metal cation selected from the group consisting of cations of metals in Groups I, II of the Periodic Table of the Elements, and Fe, Sn, and Co. Desirably, quaternary ammonium salts are used, and preferably benzyl trimethyl ammonium chloride or choline chloride is used as the curing reaction catalyst. Preferably, benzyl trimethyl ammonium chloride is used as the curing reaction catalyst.

The curing reaction catalyst may be introduced during the reactor compounding stage in a concentration of from about 0.001 to about 10.0 weight percent per copolyester resin. Desirably, the concentration may range from about 0.001 to about 1.0 weight percent per copolyester resin. Preferably, the concentration of the curing reaction catalyst is from about 0.25 to about 1.5 weight percent per copolyester resin. Optimally, the concentration of the quaternary ammonium salt as the curing reaction catalyst is about 0.60 weight percent per copolyester resin.

As may be seen by examination of the following tables, the introduction of the curing reaction catalyst during the polymerization of the copolyester resin activates the termini of the polymer which reduces the gel time of the copolyester resin without affecting the glass transition temperature and the intrinsic viscosity of the copolyester resin. Further, the impact strength of the product on the substrate is increased at constant cure cycles or the impact strength is maintained at shorter cure times at lower temperatures.

TABLE I

COMPARISON OF CATALYST CONCENTRATION WITH GEL TIMES (UNBRANCHED NEOPENTYL TEREPHTHALATE CAPPING WITH TRIMELLITIC ANHYDRIDE - IV = .20; ACID NUMBER = 55)

| Type of Catalyst | Concentration (weight percent) | Time of Processing | Average Gel Time (seconds)[3] |
|---|---|---|---|
| 1 BTMAC[1] | 0.00 | — | 375 |
| 2 BTMAC | 0.31 | Conventional Blending | 135 |
| 3 BTMAC | 0.62 | Conventional Blending | 83 |
| 4 BTMAC | 1.25 | Conventional Blending | 65 |
| 5 BTMAB[2] | 0.31 | Conventional Blending | 138 |
| 6 BTMAB | 0.62 | Conventional Blending | 92 |
| 7 BTMAB | 1.25 | Conventional Blending | 69 |
| 8 BTMAC | 0.25 | Reactor Compounding Stage | 120 |
| 9 BTMAC | 0.50 | Reactor Compounding Stage | 80 |
| 10 BTMAC | 0.75 | Reactor Compounding Stage | 78 |
| 11 BTMAC | 1.00 | Reactor Compounding Stage | 64 |

[1]Benzyl Trimethyl Ammonium Chloride
[2]Benzyl Trimethyl Ammonium Bromide
[3]204° C. (curing with DOW DER 664U RESIN)

As may be readily seen, 20% less catalyst added during the reactor compounding stage yielded similar gel times (Example 11 versus Example 4). Gel times between BTMAC and BTMAB are comparable, although BTMAC is preferred.

TABLE II

EFFECTS OF BRANCHING AND CATALYST ON COATING PROPERTIES

| Sample[a] | 1 | 2 | 3 | 4 |
|---|---|---|---|---|
| % BTMAC[b] | 0 | 0.25 | 0.25 | 0.5 |
| % TMP | 0 | 1.5 | 2.0 | 3.8 |
| Intrinsic Viscosity | 0.20 | 0.21 | 0.20 | 0.19 |
| Acid Number | 55 | 49 | 50 | 51 |
| Gel Time (400° F.) | 375 | 220 | 212 | 96 |
| Pill Flow (45° 20 min. at 380° F.) | 6.25 | | | 7.0 |
| Cure Cycle (min/°F.) | 30/380 | 30/380 | 30/380 | 30/380 |
| Gardner Impact (in-lbs., Visual/Microscopic) | 160/150 | 160/130 | 160/125 | 160/160 |
| Gloss (60°/20°) | 96/78 | 98/78 | 99/83 | 100/76 |
| Cure Cycle (min/°F.) | 20/360 | — | — | 20/350 |
| Gardner Impact | 30/10 | — | — | 160/160 |
| Gloss | 97/84 | — | — | 100/75 |
| Cure Cycle (min/°F.) | 20/340 | — | — | 20/325 |
| Gardner Impact | 20/20 | — | — | 30/30 |
| Gloss | 96/82 | — | — | 99/80 |

EXTRUDER COMPOUNDED WITH DOW DER 663U AT 1.0/1.0 STOICHIOMETRY WITH PIGMENTS AND FLOW AGENT

[a]Polyesters are poly(neopentyl terephthalate) capped with the same amount of trimellitic anhydride and with the specified mole % of trimethylol propane (TMP) replacing neopentyl glycol.
[b]Benzyl Trimethyl Ammonium Chloride As may be seen in Table II, the curing reaction is enhanced by the addition of the curing reaction catalyst during the reactor compounding stage.

A comparison of samples 1 and 4 shows the effect of catalyst on a Gel Time and Gardner Impact. Gardner Impact is better for the catalyzed sample under all three curing conditions, especially for the shorter cure times at lower temperatures.

The effect of internal branching is also demonstrated in Table II. As the concentration of trimethylol propane increases, Pill Flow and Gloss increase showing a lower melt viscosity prior to the gel point.

For measurement of gel times, the polyester resin and epoxy resin are ground to a fine powder. The powders are then mixed according to the ratio of their equivalent weights. Usually a 1 gram sample is prepared and thoroughly mixed. The gel plate is controlled at 400° F. (204° C.) and a small amount of sample is placed on the gel plate. A timer is started immediately after the sample is placed on the gel plate. The sample is mixed thoroughly as it melts. Stirring is continued until the mass can no longer be moved as a fluid. This time is noted as the "gel time."

Test results for gel time without extruding differ from the gel test performed on extruded mixtures since, for carboxyl-terminated resins, compounding time reduces gel time.

Curing agents suitable for carboxyl terminated end groups as modified by the concepts of this invention may be used. Representative examples include any epoxy resin or epoxide compound such as bisphenol-A type epoxy resins and triglycidyl isocyanurate.

Powder coating resins may be produced from the modified copolyester resin of the present invention by compounding with pigments, flow agents, and the above-described curing agents for application to appliances, outdoor furniture, and other similar substrates.

Another use of the copolyester resin with activated termini is the continuation of reaction processing of the modified copolyester resin according to U.S. application, Ser. No. 223,973, copending with this application and assigned to the same assignee as of this application. That application is fully incorporated by reference as if fully rewritten herein.

While according to Patent Statutes, the best mode for carrying out the invention has been provided, the invention is not to be limited to or thereby. Consequently, for an understanding of the scope of the invention, reference is made to the following claims.

What is claimed is:

1. A process to induce rapid curing of a copolyester resin, comprising:

reacting from about 0.001 to about 10.0 weight percent of a curing reaction catalyst with the copolyester resin during the polymerizaton of the copolyester resin, such that the copolyester resin has activated termini prior to compounding the copolyester resin with an epoxide compound, said activated termini permitted rapid curing of the copolyester resin after said compounding and during heating of the copolyester-epoxide mixture;

said polymerization comprises an esterification stage, a condensation stage, a reactor compounding stage, and finishing stage;

said reaction occurring during said reactor compounding stage; and wherein said curing reaction catalyst is selected from compounds having the formulae, and combinations thereof:

$$N^+R_4X^-$$

where R, which may be the same of different, is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, an aryl radical having from 6 to 24 carbon atoms, and an aralkyl radical having from 7 to 24 carbon atoms, and combinations thereof; and where X is a halide radical selected from the group consisting of fluoride, chloride and bromide;

$$AR_t$$

where R is the same as that described above and may be the same or different; where A is selected from the group consisting of N, P, and Sn; and where t is 3 when A is N or P or is 4 when A is Sn; or $$(R_3COO^-)_n(M)^{n+}$$

where n is a number from 1 to 3, where R is the same as that described above, where M is a metal cation selected from the group consisting of cations of metals in Groups I and II of the Periodic Table of the Elements, and Fe, Sn, and Co.

2. A process to induce rapid curing of a copolyester resin, according to claim 1, wherein said esterification stage comprises reacting a diol and a dicarboxylic compound to form a polyester prepolymer;

said dicarboxylic compound is selected form the group consisting of dicarboxylic acids and dicarboxylic esters, said dicarboxylic acids are selected from the group consisting of alkyl dicarboxylic acids having a total of from 2 to 16 carbon atoms and aryl dicarboxylic acids having a total of from 8 to 16 carbon atoms, said dicarboxylic esters are selected from the group consisting of alkyl diesters having from 2 to 20 carbon atoms, and alkyl substituted aryl diesters having from 10 to 20 carbon atoms;

and said diol is in a concentration from about 115 to 220 mole percent of the concentration of said dicarboxylic compound and is selected from the group consisting of diols having from 2 to 10 carbon atoms.

3. A process to induce rapid curing of a copolyester resin, according to claim 2, wherein said esterification stage further comprises reacting said diol and said dicarboxylic compound with a chain branching agent to form an internally branched polyester prepolymer;

said chain branching agent is in a concentration of less than about 10 mole percent of the concentration of said dicarboxylic compound and is selected from the group consisting of trimellitic anhydride, pentaerythritol, glycerol, trimethylol propane, triethylol propane and combinations thereof.

4. A process to induce rapid curing of a copolyester resin, according to claims 2 or 3, wherein said condensation stage comprises polymerizing said polyester prepolymer to form a polycondensed copolyester having an intrinsic viscosity of from about 0.10 to about 0.26 dl/g in a 60/40 phenol-tetracloroethane solvent, and having a glass transition temperature of at least 40° C.

5. A process to induce rapid curing of a copolyester resin, according to claim 4, wherein said reactor compounding stage further comprises reacting a carboxyl capping agent with the copolyester resin so that from 1 mole percent to about 25 mole percent of the total carboxylate units in the finished copolyester are derived from the capping agent; and wherein said carboxyl capping agent is the anhydride of an acid having at least two acid groups, which upon reaction with the terminus of the polymer chain, retains at least one free carboxyl acid group.

6. A process to induce rapid curing of a copolyester resin, according to claim 5, wherein said carboxyl capping agent is an anhydride selected from the group of compounds having the following formulae:

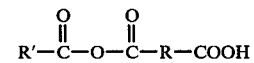

where R is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, an aryl radical having from 6 to 24 carbon atoms, and an aralkyl radical having from 7 to 24 carbon atoms; where R' is an organic radical volatile at temperatures of the carboxyl capping reaction;

and anhydrides of the formula:

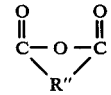

where R" is an organic radical having from 1 to 18 carbon atoms.

7. A process to induce rapid curing of a copolyester resin, according to claim 6, wherein said carboxylic terminus-capping agent is trimellitic anhydride.

8. A process to induce rapid curing of a copolyester resin, according to claim 1, wherein said curing reaction catalyst is selected from the group consisting of benzyl trimethyl ammonium chloride, benzyl trimethyl ammonium bromide, choline chloride, and combinations thereof.

9. A process to induce rapid curing of a copolyester resin, according to claim 1, wherein said catalyst concentration is from about 0.25 to about 1.50 weight percent per copolyester resin.

10. A composition of matter, comprising:

the reaction product of a copolyester resin and a curing reaction catalyst, said reaction product having activated termini for rapid curing upon heating of the mixture, of said reaction product and an epoxide compound, said curing reaction catalyst reacting in a concentration of from about 0.001 to about 2.0 weight percent of said copolyester resin;

said copolyester resin produced by a polymerization which comprises an esterification stage, a condensation stage, a reactor compounding stage, and a finishing stage;

said reaction occurring during said reactor compounding stage;

said curing reaction catalyst is selected from compounds having the following formulae, and combinations thereof:

$$N^+R_4 X^-$$

where R, which may be the same or different, is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, and an aralkyl radical having from 7 to 24 carbon atoms, and combinations thereof; and where X is a halide radical selected from the group consisting of fluoride, chloride and bromide; and $$AR_t$$

where R is the same as that described above and may be the same or different; where A is selected from the group consisting of N, P, and Sn; and where t is 3 when A is N or P, or is 4 when A is Sn; or $$(R_3COO^-)_n (M)^{n+}$$

where n is a number from 1 to 3, where R is the same as that described above, where M is a metal cation selected from the group consisting of cations of metals in Groups I and II of the Periodic Table of the Elements, and Fe, Sn, and Co.

11. A composition of matter, according to claim 10, wherein said esterification stage comprises reacting a diol and dicarboxylic compound to form a polyester prepolymer;

said dicarboxylic is compound selected from the group consisting of dicarboxylic acids and dicarboxylic esters, said dicarboxylic acids are selected from the group consisting of alkyl dicarboxylic acids having a total of from 2 to 16 carbon atoms, and aryl dicarboxylic acids having a total of from 8 to 16 carbon atom, said dicarboxylic esters are selected from the group consisting of alkyl diesters having from 2 to 20 carbon atoms, and alkyl substituted aryl diesters having from 10 to 20 carbon atoms; and said diol is in a concentration from about 115 to 220 mole percent of the concentration of said dicarboxylic compound and is selected from the group consisting of diols having from 2 to 10 carbon atoms.

12. A composition of matter, according to claim 11, wherein said esterification stage further comprises reacting said diol and said dicarboxylic compound with a chain branching agent to form an internally branched polyester prepolymer; and said chain branching agent is in a concentration of less than about 10 mole percent of the concentration of said dicarboxylic compound and is selected from the group consisting of trimellitic anhydride, pentaerythritol, glycerol, trimethylol propane, triethylol propane and combinations thereof.

13. A composition of matter, according to claims 10 or 11, wherein said condensation stage comprises polymerizing said polyester prepolymer to form a polycondensed copolyester having an intrinsic viscosity of from about 0.10 to about 0.26 dl/g, and having a glass transition temperature of at least 40° C.

14. A composition of matter, according to claim 13, wherein said reactor compounding stage further comprises reacting a carboxyl capping agent with the copolyester resin so that from 1 mole percent to about 25 mole percent of the total carboxylate units in the finished copolyester are derived from the capping agent.

15. A composition of matter, according to claim 14, wherein said carboxyl capping agent is the anhydride of an acid having at least two acid groups which, upon reaction with the terminus of the polymer chain, retains at least one free carboxyl acid group.

16. A composition of matter, according to claim 15, wherein said carboxyl capping agent is an anhydride selected from the group of compounds having the following formulae:

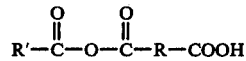

$$R'-\overset{O}{\underset{\|}{C}}-O-\overset{O}{\underset{\|}{C}}-R-COOH$$

where R is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, an aryl radical having from 6 to 24 carbon atoms, and an aralkyl radical having from 7 to 24 carbon atoms; where R' is an organic radical volatile at temperatures of the carboxyl capping reaction;

and anhydrides of the formula:

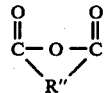

where R" is an organic radical having from 1 to 18 carbon atoms.

17. A composition of matter, according to claim 16, wherein said carboxylic terminus-capping agent is trimellitic anhydride.

18. A composition of matter, according to claim 17, wherein said curing reaction catalyst is selected from the group consisting of benzyl trimethyl ammonium chloride, benzyl trimethyl ammonium bromide, choline chloride, and combinations thereof.

19. A composition of matter, according to claim 10, wherein said catalyst concentration is from about 0.25 to about 1.50 weight percent per copolyester resin.

* * * * *

UNITED STATES PATENT OFFICE
CERTIFICATE OF CORRECTION

PATENT NO. : 4,370,452

DATED : 1-25-83

INVENTOR(S) : Paul L. Heater, Jr.

It is certified that error appears in the above-identified patent and that said Letters Patent are hereby corrected as shown below:

Column 2, line 50, delete "resin" and substitute --resins--.

Column 6, line 47, delete "$N^+R_4X^-$" and substitute --$NR_4^+ \ X^-$--

Column 6, line 67, delete "$(R_3COO^-)_n(M)^{n+}$" and substitute --$(R_3COO^-)_n \ (M)^{n+}$--

Column 9, line 21, delete "$N^+R_4X^-$" and substitute --$NR_4^+ \ X^-$--

Column 9, line 24, delete "of" and substitute --or--.

Column 9, line 44, delete "$(R_3COO^-)_n(M)^{n+}$" and substitute --$(R_3COO^-)_n \ (M)^{n+}$--

UNITED STATES PATENT OFFICE
CERTIFICATE OF CORRECTION

PATENT NO. : 4,370,452

DATED : 1-25-83

INVENTOR(S) : Paul L. Heater, Jr.

It is certified that error appears in the above-identified patent and that said Letters Patent are hereby corrected as shown below:

Column 11, line 22, delete "$N^+R_4X^-$" and substitute --$NR_4^+ \, X^-$--

Column 11, line 44, delete "$(R_3COO^-)_n(M)^{n+}$" and substitute --$(R_3COO^-)_n \, (M)^{n+}$--

Signed and Sealed this

Second Day of April 1985

[SEAL]

Attest:

DONALD J. QUIGG

*Attesting Officer*   *Acting Commissioner of Patents and Trademarks*